United States Patent [19]

Kitchen et al.

[11] 4,346,892
[45] Aug. 31, 1982

[54] ELECTRONIC POOL GAME

[76] Inventors: Garry E. Kitchen, 137 New Bridge Rd.; Steven G. Kitchen, 520 Knoll Rd., both of New Milford, N.J. 07646; James C. Wickstead, Pitney Rd. & W. Main St., Mendham, N.J. 07945

[21] Appl. No.: 121,950

[22] Filed: Feb. 15, 1980

[51] Int. Cl.³ .............................................. A63F 9/02
[52] U.S. Cl. .................................. 273/85 G; 273/313
[58] Field of Search ............ 273/85 G, DIG. 28, 1 E, 273/1 GC, 1 GE; 340/724, 725, 753

[56] References Cited

U.S. PATENT DOCUMENTS

| | | | |
|---|---|---|---|
| 3,337,218 | 8/1967 | Hurley | 273/85 G |
| 3,708,636 | 1/1973 | Sobchak | 200/6 A |
| 3,778,058 | 12/1973 | Rausch | 273/DIG. 28 |
| 3,809,395 | 5/1974 | Allison, Jr. et al. | 273/DIG. 28 |
| 4,093,223 | 6/1978 | Wilke et al. | 273/85 G |
| 4,199,758 | 4/1980 | Wilhelm et al. | 340/753 |

FOREIGN PATENT DOCUMENTS 2416510  10/1979  France .................. 273/856

OTHER PUBLICATIONS

Electronics, "*T I Makes Noise in Games, Toys*", 6/23/77, pp. 31 & 32.

David L. Heiserman, "*How to Design & Build Your Own Custom TV Games*", Nov. 78, pp. 470–483.
Walter H. Buchbaum, "*Electronic Games*", 1979, pp. 69–73.

*Primary Examiner*—Vance Y. Hum
*Assistant Examiner*—Leo P. Picard
*Attorney, Agent, or Firm*—Blum, Kaplan, Friedman, Silberman & Beran

[57] ABSTRACT

An electronic pool game including a matrix display representative of the playing surface of a pool table, a control and driving circuit for applying driving signals to the matrix display for the display of indicia representative of pool balls, including a cue ball, on the matrix display, the driving and control circuit being further adapted for the selective application of further driving signals to the matrix display for the display of further indicia representative of direction of travel of the cue ball, and input switches for applying control signals to the control and driving circuit to control the placement and orientation of the direction indicia and at least the initiation of the displacement across the matrix display of the indicia representative of the cue ball in the direction indicated by the orientation of the direction indicia. The driving and control circuit may be adapted to detect the duration of engagement of an input switch for controlling the velocity of displacement of the cue ball indicia proportional to at least a portion of the duration of such engagement.

19 Claims, 22 Drawing Figures

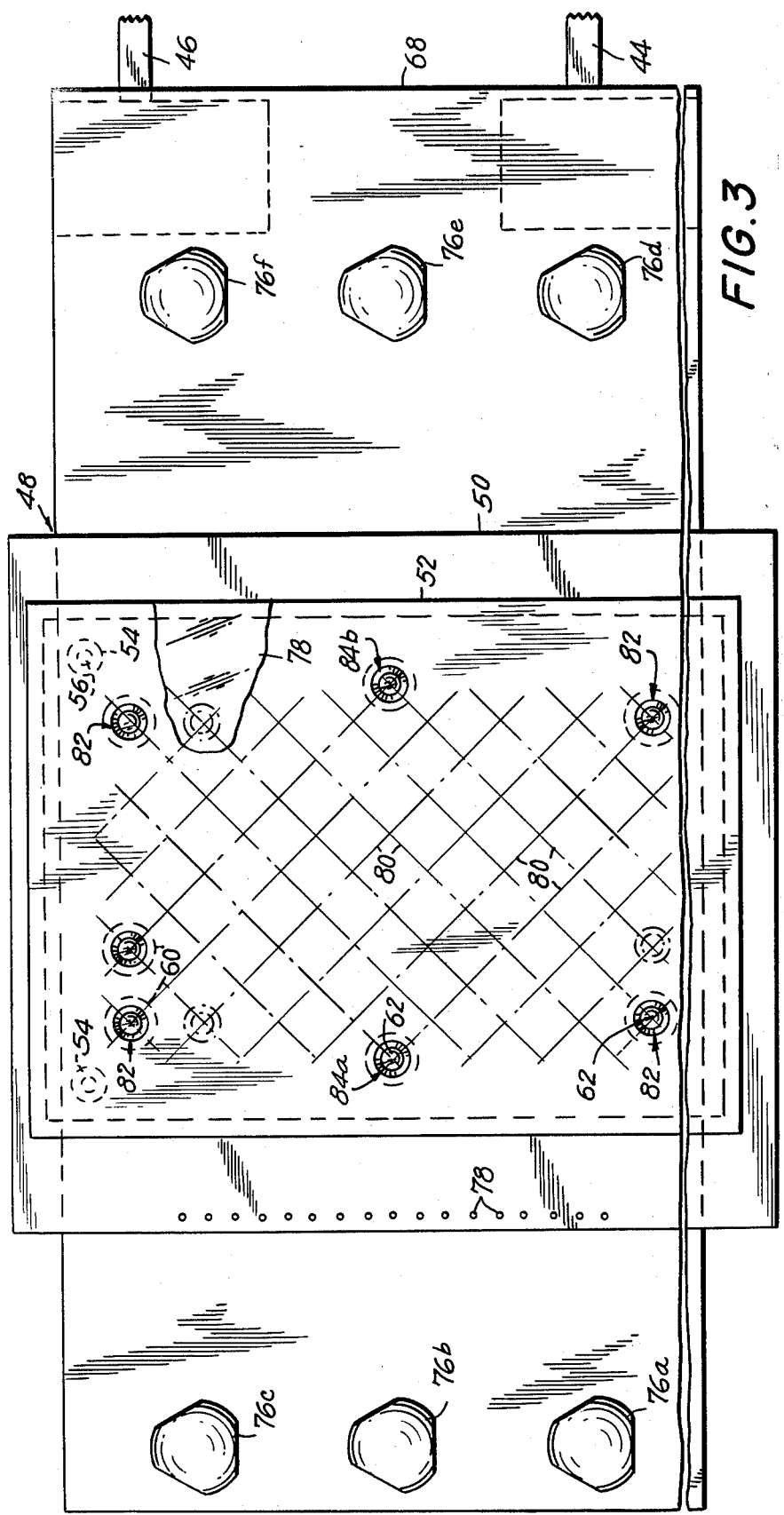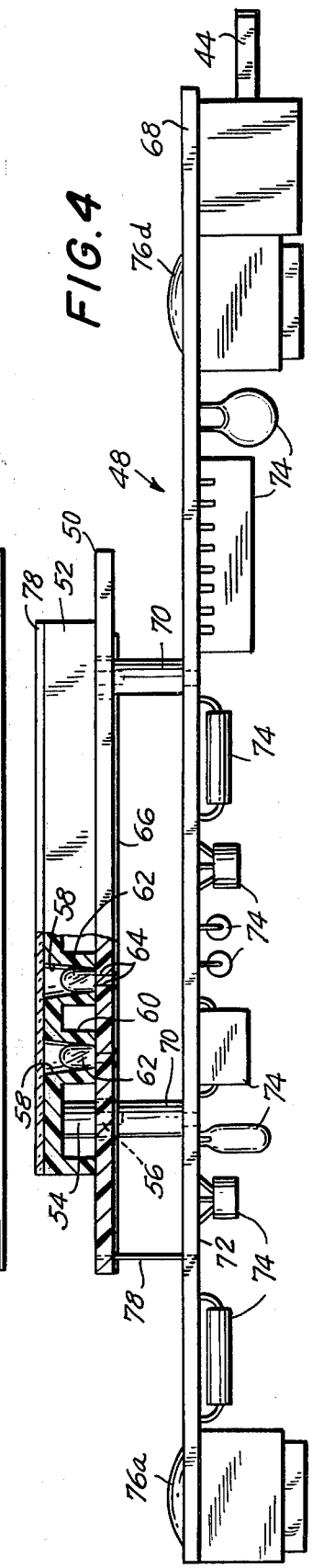
FIG. 3
FIG. 4

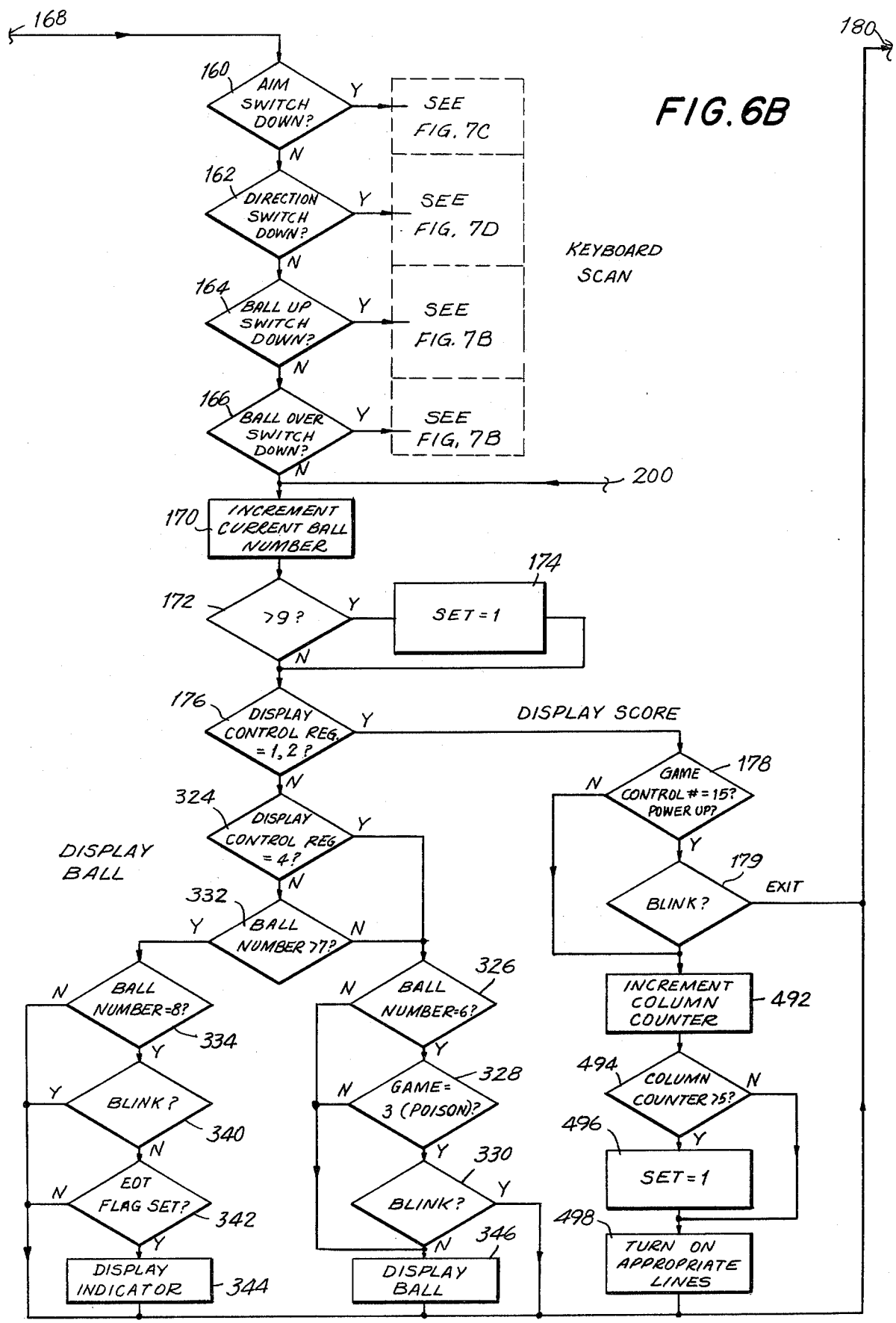

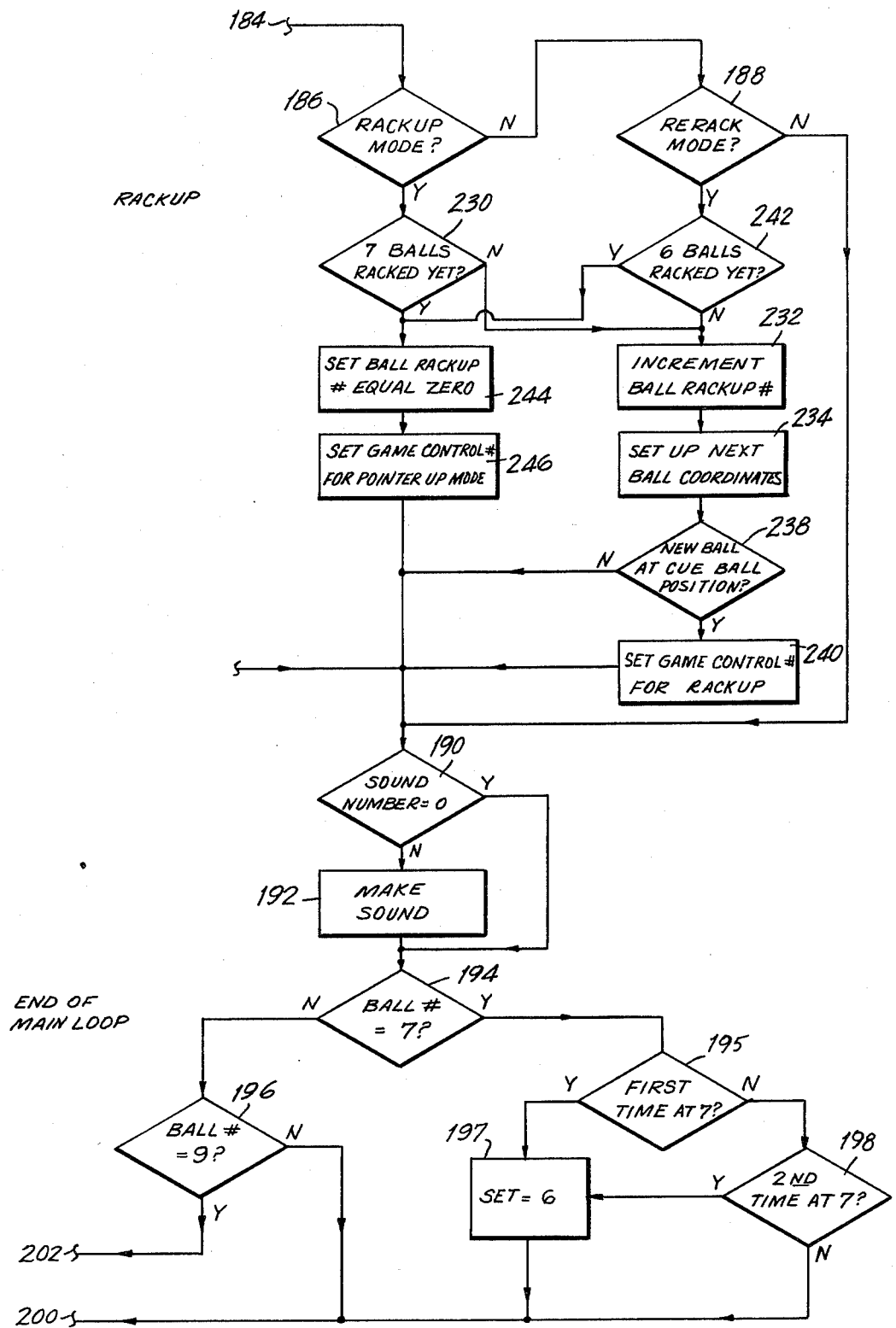

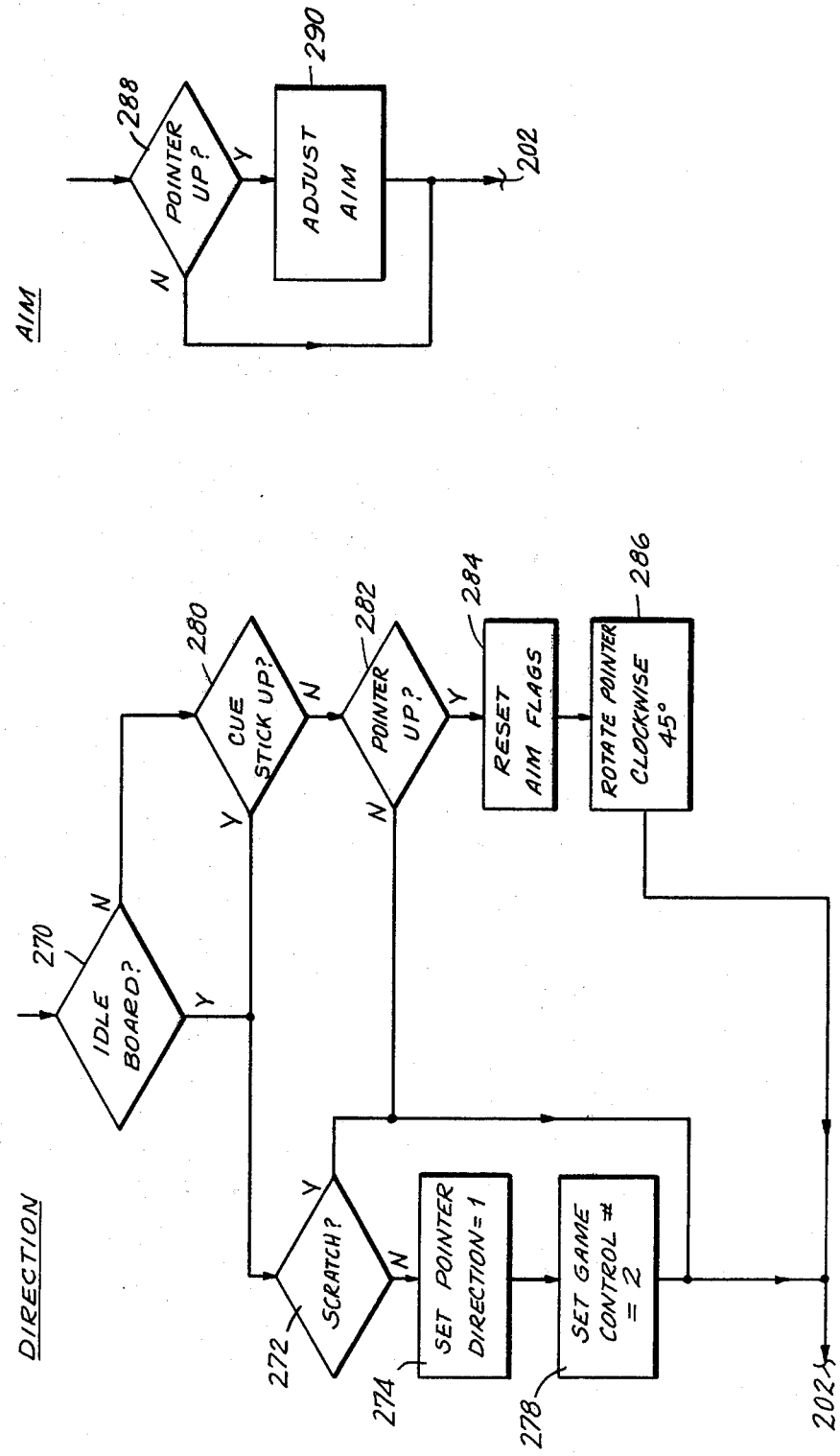

ELECTRONIC POOL GAME

BACKGROUND OF THE INVENTION

This invention relates generally to electronic games and in particular, to an electronic game capable of realistically simulating the play of pool games. In the art, several electronic games have been provided simulating the play of various sporting events through the use of various LED display arrays and controls. These games have generally been characterized by the manually controlled displacement of ball-indicating indicia across a playing field against the "defense" of an opposing team. Sports such as basketball, football and soccer have been thus simulated by electronic games.

The electronic simulation of a pool game, to be realistic, must permit the player to establish both the direction and velocity of the "cue ball" in order to create realistic playing conditions, and must also permit essentially 360 degree aiming of the cue ball. A realistic pool game should also simulate the act of shooting by the striking of the cue ball by a "cue stick". The play value of such an electronic game would be greatly enhanced if provision was made for the seeding of balls at selected positions in the display representative of the pool table and, under appropriate circumstances, the selective position of the cue ball. By providing an electronic pool game capable of performing the foregoing functions and of realistically simulating the play of the game of pool and variations thereof, a new and novel electronic game is provided.

SUMMARY OF THE INVENTION

Generally speaking, in accordance with the invention, an electronic pool game is provided which includes matrix display means for providing a representation of the playing surface of a pool table; driving and control circuit means for applying driving signals to said matrix display means for the positioning of indicia representative of pool balls at discrete locations on said matrix display means, including a cue ball, and for providing further driving signals to said matrix display means for providing indicia representative of intended direction of displacement of said cue ball indicia; and input switch means coupled to said driving and control circuit means for selective application of control signals to said driving and control circuit means for the selective positioning of said direction indicia and for the selective initiation of the displacement of said cue ball indicia in the direction determined by the position of selective initiation of the displacement of said cue ball indicia in the direction determined by the position of said direction indicia.

Said driving and control circuit means includes means for detecting the duration of engagement of an input switch means and for displacing the cue ball indicia at a velocity proportional to at least a portion of the duration of engagement of said input switch means. Said input switch means is adapted to apply further control signals for the selective positioning of pool ball indicia at discrete locations on said matrix display means. Said input switch means is also adapted to apply still further control signals to said driving and control circuit means for the display of indicia representative of score in the form of a bar graph on said matrix display means.

The matrix display means may include a matrix of LED means and plate means overlying said LED matrix, said plate means being provided with an aperture in registration with each each LED means,, each said aperture being of circular cross-section for defining a ball-shaped indicia.

Said input switch means is adapted to produce a first direction control signal for indexing said direction indicia circumferentially about the cue ball indicia between a plurality of discrete directions and a second direction control signal for the indexing of said direction indicia laterally a discrete amount on either side relative to the selected discrete direction for laterally displacing the desired path of said cue ball indicia.

Accordingly, it is an object of this invention to provide an electronic pool game which closely simulates the play of an actual pool game.

Another object of the invention is to provide an electronic pool game which can be hand-held and battery powered and which can be readily used by a child.

Still another object of the invention is to provide an electronic pool game with substantial play value through realistic simulation of the play of pool games.

Another object of the invention is to provide an electronic pool game providing control of the direction and velocity of displacement of the cue ball indicia.

Still a further object of the invention is to provide an electronic pool game which permits the player to set up selected pool shots by the selective seeding and placement of pool ball indicia.

Still other objects and advantages of the invention will in part be obvious and will in part be apparent from the specification and drawings.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 3 is a top enlarged fragmentary plan view of the circuit, switch and display module of the electronic pool game of FIG. 1;

FIG. 4 is a side elevational view, with portions broken away, of the module of FIG. 3;

FIGS. 6A, 6B, 6C, 6D and 6E depict a flow chart illustrating the basic operation of the control and driving circuit of the pool game in accordance with the invention;

FIGS. 7A, 7B, 7C, 7D and 7E depict, respectively, flow charts of the keyboard routines associated with the cue up/shoot, ball up/ball over, select/score, direction and aim control switches respectively.

DESCRIPTION OF THE PREFERRED EMBODIMENTS

Figure 1:
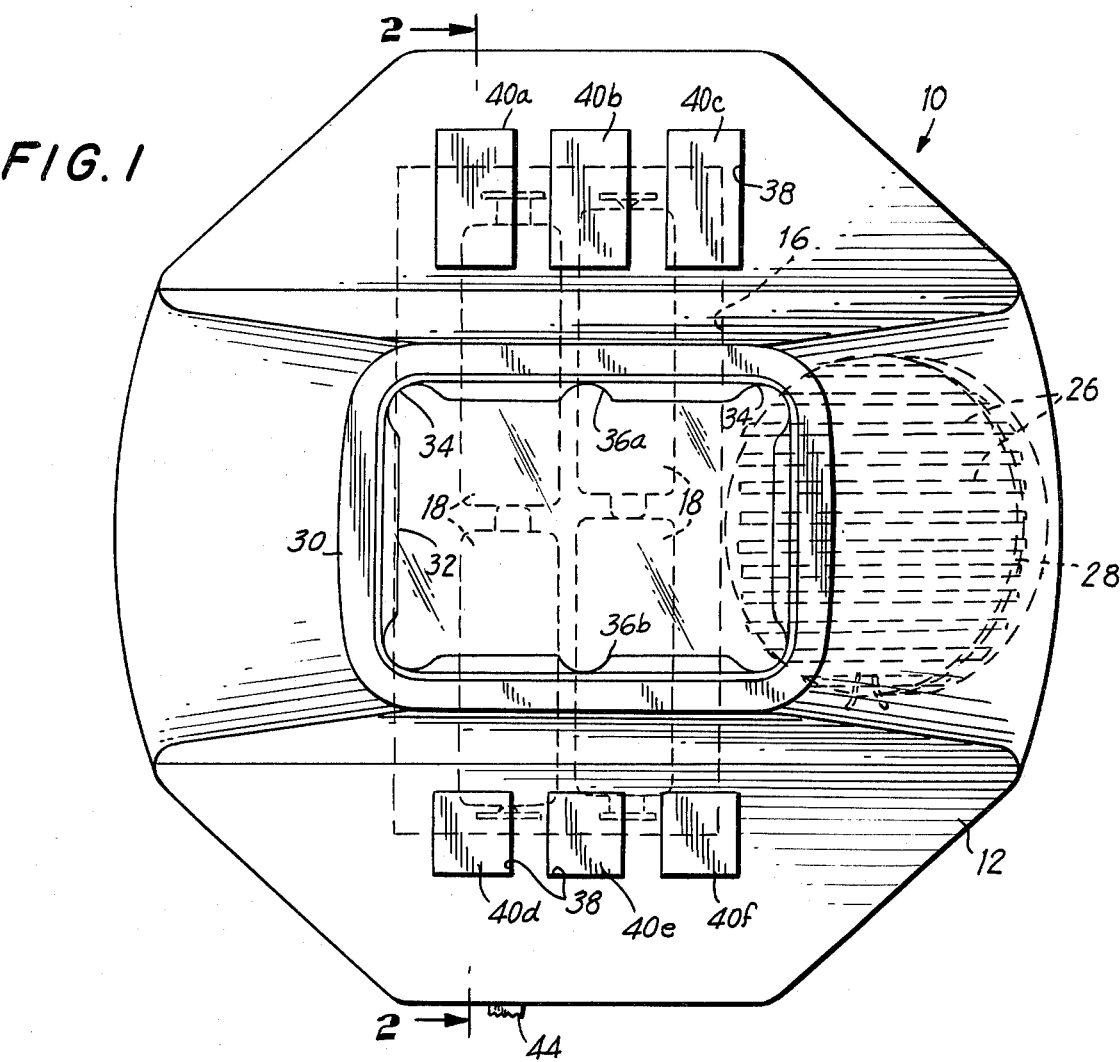
FIG. 1 is a top plan view of an electronic pool game in accordance with the invention.
Figure 2:
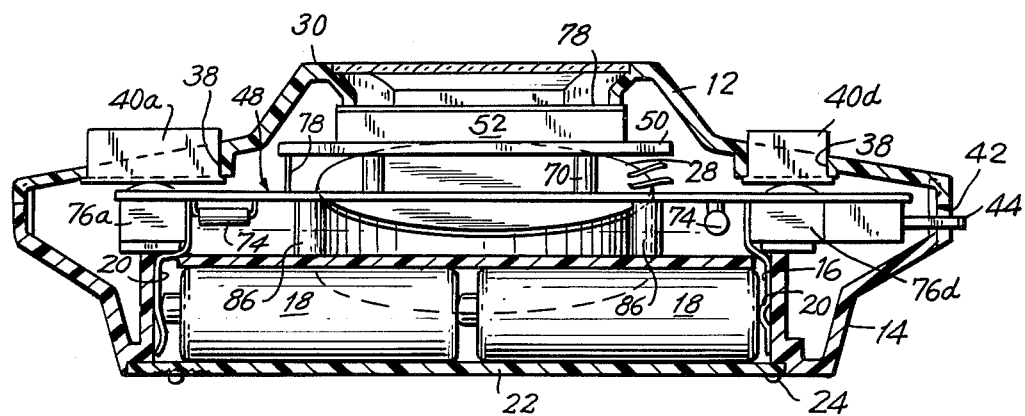
FIG. 2 is a sectional view taken along lines 2—2 of FIG. 1.

Referring now to FIGS. 1–4, an embodiment of an electronic pool game in accordance with the invention is depicted generally by reference numeral 10. The game includes a top housing member 12 and a bottom housing member 14 joined by adhesive or screws (not shown). Bottom housing member 12 is formed with a central well 16 defining a battery compartment receiving batteries 18 connected to provide power to the game through terminals 20. The battery compartment defined by well 20 is closed by a removably mounted battery cover 22 of conventional design. Game 10 is designed to be hand-held, or may be placed on a table top, resting on feet 24 (FIG. 2). Bottom housing 12 is also formed with a grill opening 26 (FIG. 1), a speaker 28 being mounted therein in registration with the grill opening for the transmission of audible sounds as will be more particularly described below.

Top housing member 12 is formed with a central upwardly projecting region defining, at the top thereof, a rim 30 shaped to simulate the periphery of a pool table and formed with a central opening 32 shaped to define the playing field of said opening, including corner pockets 34 and side pockets 36a and 36b.

Top housing member 12 is formed with three openings 38 on each side of rim 30 defining apertures for receiving and capturing push buttons 40a representative of the "SELECT/SCORE" function, 40b representative of the BALL UP function, 40c representative of the BALL OVER function, 40D representative of the AIM function, 40e representative of the DIRECTION function and 40f representative of the CUE UP/SHOOT function, all of which will be described more particularly below.

Bottom housing member 14 is provided with a first notch 42 on the periphery thereof defining an opening through which a power switch 44 projects for the turning on and turning off of the game. A second notch (not shown) is provided in the same side of said bottom housing member to provide access to an external power jack 46 (FIG. 3) for powering by other than the batteries.

Referring now more particularly to FIGS. 3 and 4, the circuit module 48 includes a display circuit board 50 on which is mounted a light pipe frame 52 preferably formed of an opaque plastic material. Light pipe frame 52 is secured to display circuit board 50 by four legs 54 ending in suitable stakes 56. Light pipe frame 52 is formed, in the depicted embodiment, with a matrix array of seventy tapered apertures of circular cross-section 58, the light pipe frame 52 being formed with a suitable downwardly projecting region 60 reaching to the top surface of display circuit board 50 so as to defined a continuous tapered aperture from the surface of the circuit board to the top surface of the light pipe frame. Received within each aperture 58 is a light emitting diode (LED) 62 connected by leads 64 to a printed circuit 66 deposited on the bottom surface of display circuit board 50.

Display circuit board 50 is itself mounted on a main circuit board 68 by means of spacers 70. The undersurface 72 of main circuit board 68 is formed with a printed circuit providing interconnection between the circuit elements 74 which define the control and driving circuit of the electronic game in accordance with the invention. Six dome switches 76a, 76b, 76c, 76d, 76e and 76f, corresponding respectively to push buttons 40a, 40b, 40c, 40d, 40e and 40f, for operation thereby, are mounted on main circuit board 68. Each of dome switches 76 is electrically connected to the circuit defined by circuit elements 74, the dome-shaped actuator thereof being resilient for the return of the corresponding push button 40 to its original position after actuation by the user. Also mounted on main circuit board 68 is a power switch 44 and power jack 46. The LED array mounted on display circuit board 50 is electrically connected to the driving and control circuit by circuit element 72 through an array of leads 78 extending therebetween. A diffuser, such as a read mylar diffuser screen 78, extends across the top surface of light pipe frame 52. The apertures 58 insure the provision of a round indicia representative of a "ball" at each of the seventy matrix positions represented schematically by the intersection of the chain lines 80 in FIG. 3. The diffuser produces a uniformly displayed indicia image upon the lighting of the LED in each aperture. It is noted that the four corner apertures 82 represent the respective corner pocket positions corresponding to pockets 34 in rim 30. Similarly, the two central side apertures 84a and 84b correspond respectively to the two side pocket positions 36a and 36b in the rim 30. As is more particularly shown in FIG. 2, module 48 is itself mounted on bottom housing member 14 by means of legs 86.

Figure 5:
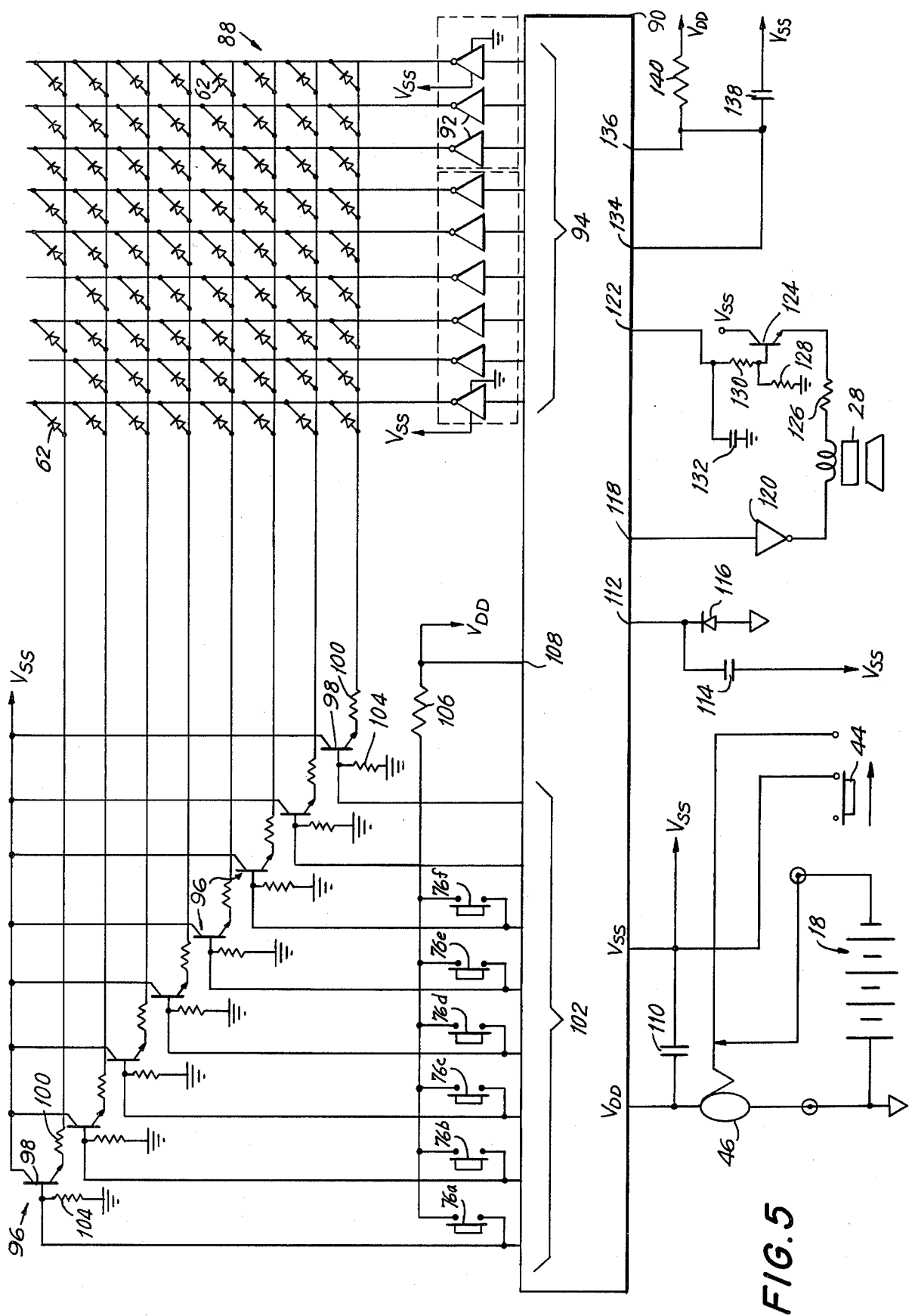
FIG. 5 is a circuit diagram of the electronic game in accordance with the invention.

Referring now to FIG. 5, the driving and control circuit in accordance with the invention is depicted, like reference numerals as were used in FIGS. 1-4, being applied to FIG. 5. Shown generally at reference numeral 88 is an X-Y addressable matrix defined by the seventy (in this embodiment) LED's 62 mounted respectively in the matrix of apertures 58. The heart of the driving and display circuit is a programmed microprocessor 90, as for example, Model TMS-1400 manufactured by Texas Instruments Company. Microprocessor 90 includes a random access memory (RAM) which serves as a scratch pad memory and includes a read only memory (ROM), storing the program for controlling the operation of the control and display circuit in response to the actuation of the respective switches 76. The columns of the X-Y matrix 88 are driven through amplifiers 92 from suitable outlet terminals 94 of microprocessor 90. The respective rows of the X-Y matrix 88 are each driven by a driving circuit 96, each said driving circuit consisting of an NPN transistor having its collector connected to a bias voltage $V_{SS}$ and its emitter connected through resistor 100 to the associated row. The base of each transistor is coupled to an outlet terminal 102 of microprocessor 90 and is biased to ground by a resistor 104. Each of six of outlet terminals 102 is also coupled to one side of one of switches 76a, 76b, 76c, 76d, 76e, and 76f, the other side of said switches being connected in common through a resistor 106 to a bias voltage $V_{DD}$ and to a push button terminal 108 on microprocessor 90. When outlet terminals 94 are not driven, indicating that the display is not being driven, the status of the six switches may be sequentially determined by the sequential actuation of the six of output terminals 102 connected therewith.

The bias voltages $V_{DD}$ and $V_{SS}$ are provided by either batery 18 or an external power source applied through external power jack 46, as controlled by power switch 44 and smoothed by capacitor 110. The microprocessor chip 90 is biased through terminal 112, connected to the external circuit defined by capacitor 114 and diode 116. The various sound signals enhancing the play value of the electronic game in accordance with the invention are produced by speaker 28, which is driven by signals of predetermined frequencies applied from terminals 118 of microprocessor 90 to amplifier 120, the duration of the sound signals being regulated by a circuit controlled by the signal from control terminal 122 of microprocessor 90, said circuit consisting of an NPN transistor 124 having its collector connected to a bias voltage $V_{SS}$ and its emitter connected through resistor 126 to speaker 28. The base of the transistor is connected to ground through resistor 128 and to control terminal 122 through resistor 130. A capacitor 132 is connected between ground and the junction of resistor 130 and control terminal 122. Finally, clock terminals 134 and 136 of micro- processor 90 are connected respectively through capacitor 138 and resistor 140 to bias voltages $V_{SS}$ and $V_{DD}$, respectively. Said clock terminals are themselves externally connected together.

For convenience, the operation of the electronic pool game in accordance with the invention, will be described in connection with the flow charts of FIGS. 6 and 7, also having reference to the structure of the game as more particularly depicted in FIGS. 1–5 and as described above. As a preliminary matter, it is noted that the display matrix is lit on a multiplex basis, only one LED being energized at any one time, the cycle being sufficiently fast so that LED's tended to register score, ball or direction indicia being repetitively turned on and off at a rate such that retinal retention time, the cycle being sufficiently fast so that LED's intended to register score, ball or direction indicia are repetitively turned on and off at a rate such that retinal retention provides the impression of continuous display.

In addition, by energizing only one LED at a time for the 11 multiplex time slots, the maximum current peaks of the game are 110 Milliamps for an average LED current of 10 milliamps for LED. This differs from the standard multiplex methods in that if four LED's are lit on a given cathode line, as in FIG. 8F, the four LED's are lit sequentially rather than at on time. If one of the six balls or the pointer or the cue stick or the cue ball are not being displayed on the playing field, then no LED is energized during that particular time slot. Thus, the duty cycle for 1 LED is always 1 out of 11 regardless of the number of LED's lit. This method of reducing peak currents allows the use of simpler and lower cost drive circuitry (Amplifiers 92 and drive circuit 96 in FIG. 5), a lower smoothing capacitor 110 and overall results in extended battery life and cooler, more reliable operation.

In the particular embodiment of the electronic game described herein, when "balls" are displayed, no more than seven balls may be displayed by the display, a cue ball and six regular balls. In addition to the seven "balls", two additional LED's may be lit, representative of "direction" or "cue stick" as will be more particularly described below. The display is capable of four separate modes of display, as controlled by a display control register incorporated in microprocessor 90. The four modes of display are designated as follows:

| REGISTER POSITION | MODE |
| --- | --- |
| 0 | BALLS ONLY |
| 1 | PLAYER ONE SCORE |
| 2 | PLAYER TWO SCORE |
| 4 | BALLS AND "CUE STICK" OR "POINTER" |

In general, the overall operation of the game is controlled by the status of a game control register having positions, referred to as "game control #", representative of various functions as follows:

| GAME CONTROL # | MODE |
| --- | --- |
| 0 | GAME SELECT |
| 1 | IDLE BOARD |
| 2 | POINTER UP |
| 3 | CUE UP |
| 4 | BALL MOVING |
| 7 | WIN |
| 8 | RACK UP |
| 9 | SHOOTER |
| 11 | SET SCORE CEILING |
| 13 | RERACK |
| 15 | POWER UP |

Figure 6A:
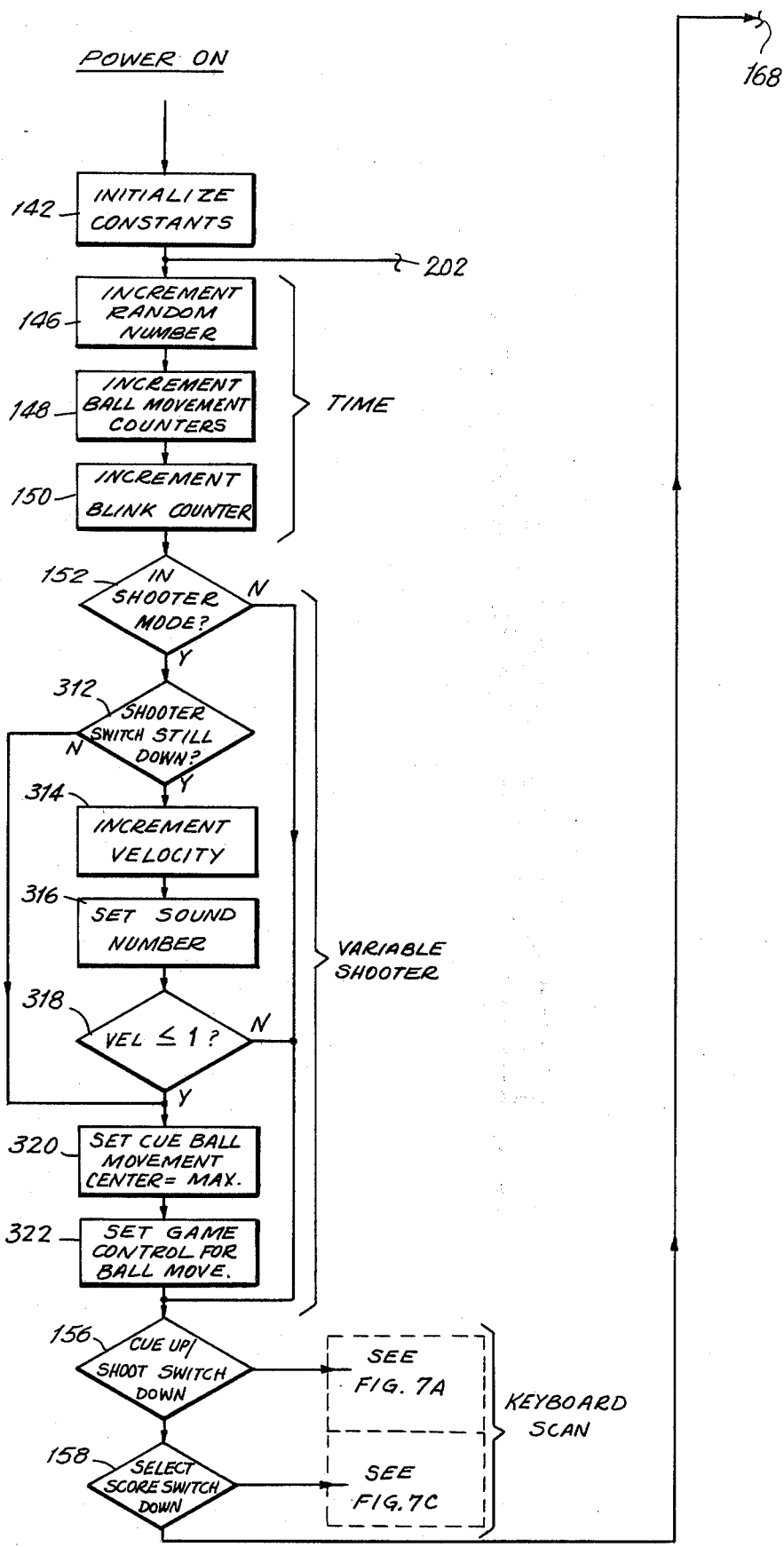

Referring to FIG. 6A, upon the turning of power switch 44 to a "power on" position, the various registers in microprocessor 90 are set to predetermined initial states as indicated by action block 142. Specifically, game control register is set to game control #15 which is representative of "power up". In addition, the display control register is set to the 1 position representative of player 1 score. In this initialized position, LED 144 (FIG. 8F) would be lit in a blinking mode indicative of the initial power-on state, as more particularly described below. The microprocessor then proceeds into the main cycle of the program, a cycle which is repetitively and continuously repeated. The first three action blocks represent "time" increment blocks. Specifically, action block 146 increments a random number representative of RAM memory location, action block 148 increments ball movement counters, there being seven ball movement counters, one associated with each of the possible displayed balls. The purpose of the ball movement counters will be discussed below. Action block 150 increments the blink counter, a sixteen position serial counter controlling "blink" functions where required. Thereafter, decision block 152 determinds if the game is in the "shooter mode". At this stage of the game, it is not in the "shooter mode" which mode will be described more particularly below, and the program follow the "no" (as indicated by "N") branch to a series of decision blocks (shown in FIGS. 6A and 6B) 156, 158, 160, 162, 164 and 166, which respectively, sequentially, test for the actuation of cue up/shoot switch 74f, select/score switch 76a, aim switch 76d, direction switch 76e, ball up switch 76b or ball over switch 74c. Reference numeral 168 represents the interconnection between the "no" branch of decision block 158 and the input of decision block 160.

In the initialized state, none of the switches are "down" and the program proceeds to an action block 170 which sets a register having at least ten positions, nine of which are representative of nine possible "ball" numnbers, a cue ball, six regular balls, and two direction or cue stick indicia. By the incrementing of the current ball number, the nine possible "balls" are sequentially actuated, if appropriate, effecting the multiplexed driving of the display.

Decision block 172 determins if the contents of the current ball number register is greater than 9, in which case the register is reset to one by action block 174. Thereafter, in either case, action block 176 determines if the display control register is in position 1 or 2, the two score modes, in which case the display score branch is followed. The first decision block in said branch, block 178 inquires if the game control # equals 15, as it would be in the "power up" state, in which case the score is blinked in response to decision block 179 and the display score branch is exited. As part of the initializing step, the score counters were set for 1, so that only indicia 144, representative of a count of one in the bar graph scoring system in accordance with the invention is blinked. Reference numeral 180 represents the junction between the exit from the display score branch on FIG. 6B and decision block 182 on FIG. 6C which determines if a ball is moving. In the instant case, at this stage of the game, the ball is not moving and the program exits, reference numeral 184 representing the junction between the exit from decision block 182 of FIG. 6C and decision block 186 of FIG. 6E. Decision block 186 determines if the game control register is in the rackup mode (game control #8), and if the answer is "no" as it would be at this stage, decision block 188 determines if the game control register is in the rerack mode (game control #13). Again, at this stage the answer is "no" and the program exits to decision block 190 which determines if the register representative of the "sound number" is a 0. The setting of the sound number register determines the duration and frequency of the sound. The sound number register is initialized to a number representative of a sound distinctive of the power on state and the microprocessor produces outputs at terminals 118 and 122 to produce the desired sound as indicated by action block 192.

Thereafter, decision block 194 determines if the ball number is equal to 7, the cue ball. If the answer is "yes" (as indicated by a "Y"), then decision block 195 determines if this is the first time in this sequence that the ball count was at 7, in which case the ball count is reset to 6 by the action block 197. If this is the second time that the ball count has been at 7 in this cycle then decision block 198 causes action block 197 to reset the ball count to 6. In this manner, the cue ball is energized three times for each energization of the other balls, creating an increased intensity so that the cue ball is readily distinguishable from the other balls. If decision block 194 determines "no", then the program proceeds to decision block 196 which determines if the sequence of the ball counter is over. If not, or if the branch of decision blocks 195 and 198 is entered, then the program exits, reference numeral 200 representing the junction between this exit in FIG. 6E and the return to the current ball register increment action block 170 of FIG. 6B, at which point the loop is repeated. In this manner, the inner loop between action block 170 of FIG. 6B and the "end of main loop" routine of FIG. 6E is repeated nine times for each cycle througgh the branch between action block 146 of FIG. 6A and action block 170 of FIG. 6B, once for each "ball". After the ninth ball, the action block 196 of FIG. 6E exits to the junction represented by reference numeral 202 which is a return to the beginning of the main loop, action block 146 of FIG. 6A.

Figure 7A:
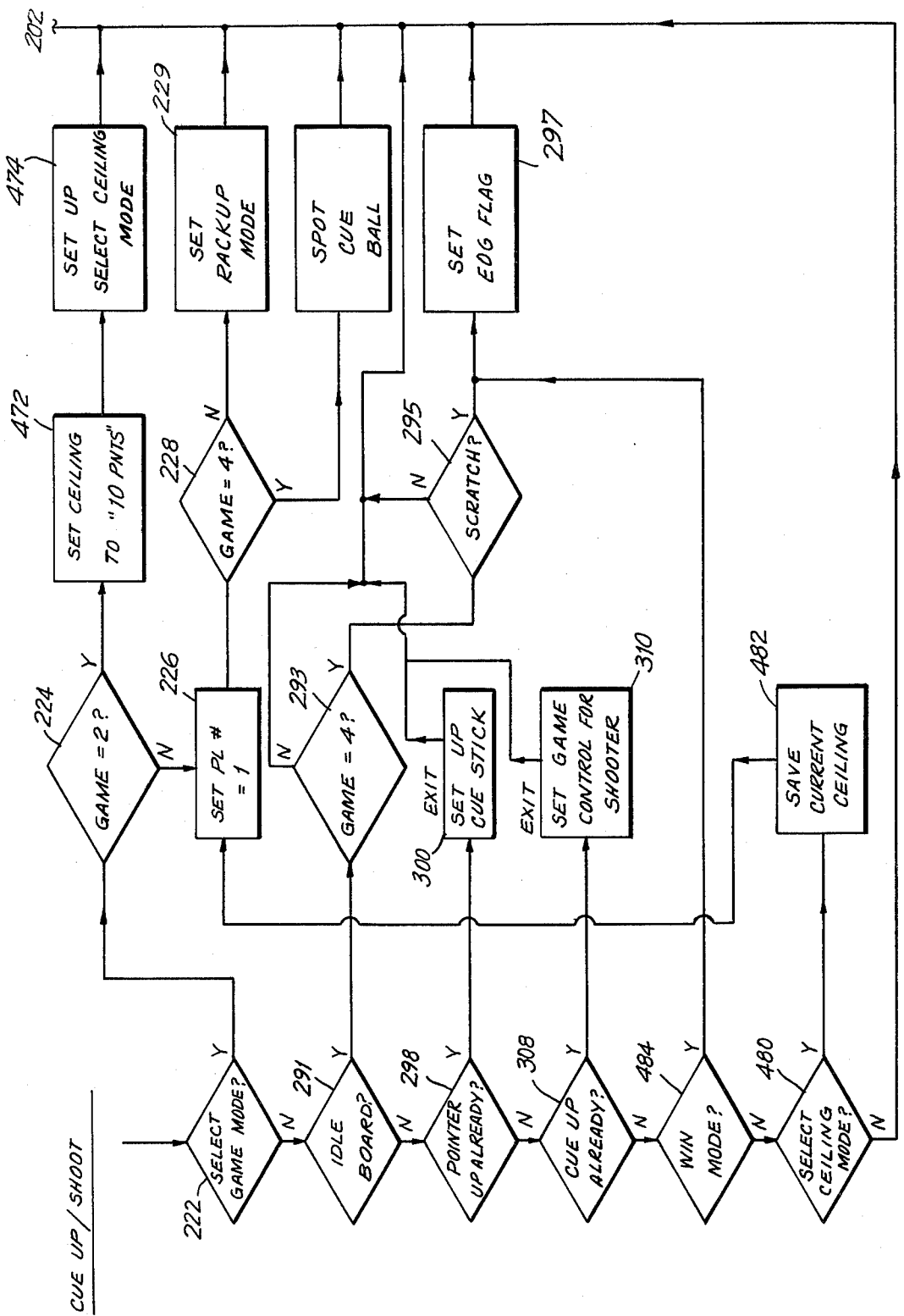
Figure 7B:
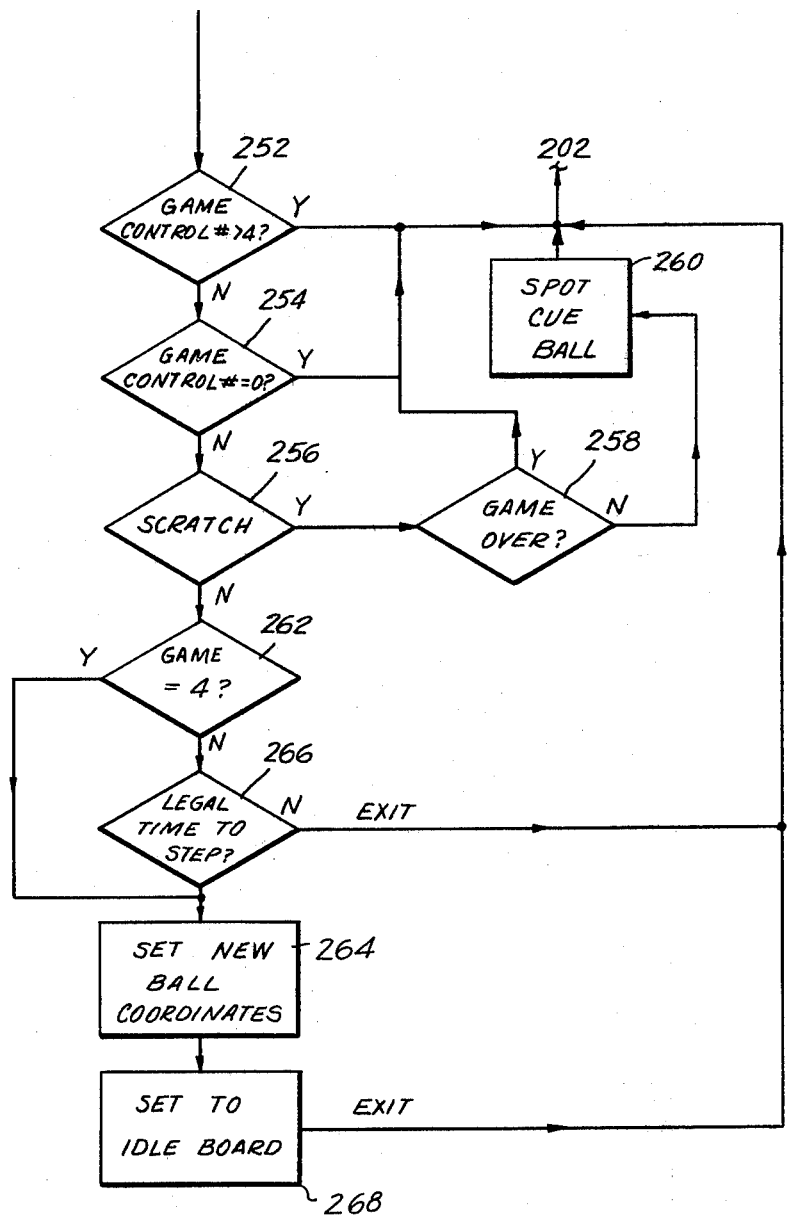
Figure 7C:
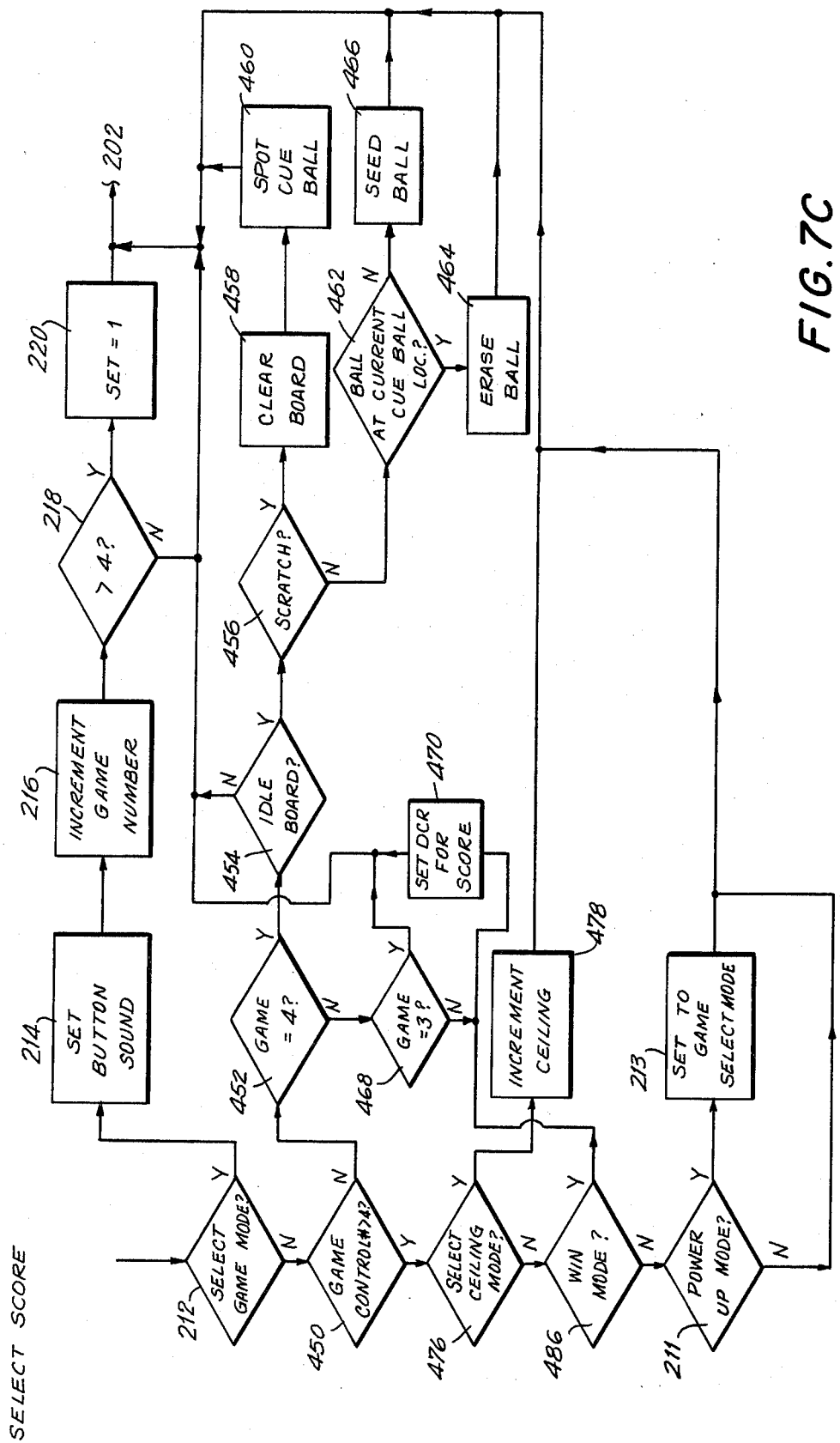

The first actuation of select/score switch 76a causes decision block 159 to enter the select/score keyboard routine of FIG. 7C. Since the game control register is set to game control #15 (power up mode), decision block 211 of FIG. 7C causes action block 213 to reset the game control register to game control #0 (game select mode). The routine exits to junction 202 of FIG. 6A.

Figure 8A:
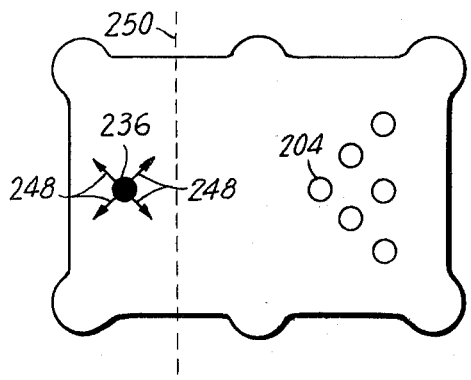
FIGS. 8A–8G depict seven examples of the display under various switch settings in accordance with the invention.
Figure 8B:
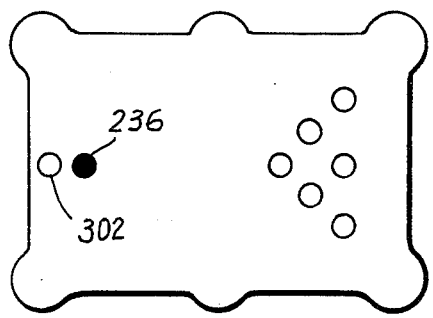
Figure 8C:
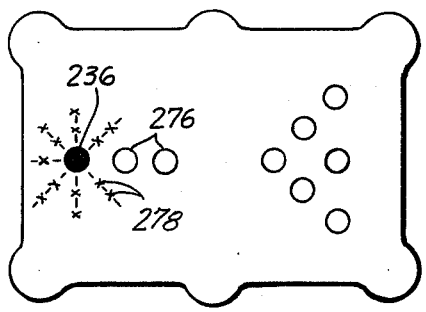
Figure 8D:
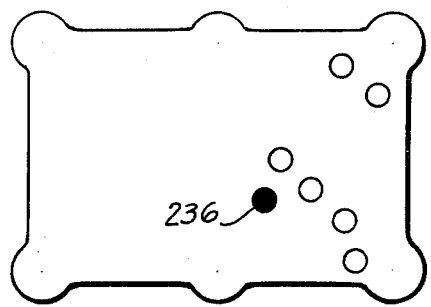

At this stage, the user must select the particular game which he wishes to play. The electronic pool game in accordance with the invention is provided with four possible games, game 1 being a single player pool game wherein the balls initially rack up in the position illustrated in FIG. 8A, the user then proceeding to sink the six regular balls. In game 1, the display reracks twice, so that a total of eighteen balls must be sunk. The score keeps track of the total number of shots required to sink the eighteen balls. Game 2 is a two player game, with the players alternately shooting, the initial rack up being as illustrated in FIG. 8A. Separate scores are maintained for each player as will be described below. Game 3 is identical to game 2 except that ball 204 of FIG. 8A constantly blinks. This ball is referred to as a "poison" ball, the sinking of which ends the game. Finally, in game 4, the user is able to seed up to six regular balls on the display at any selected position, in other words, he is able to place balls to create desired shots for the purpose of practice or otherwise. The cue ball is automatically seeded and may be displaced for seeding the other balls and for selective positioning of the cue ball. In order to select between the various games, the score indicator is utilized. Referring to FIG. 8F, indicia 144, when lit alone in the game select mode, indicates game 1. Indicia 144 and 206 together represent game 2; indicia 144, 206 and 208 together represent game 3; and indicia 144, 206, 208 and 210 together represent game 4. The game is adapted to sequence between the four games. Specifically, after power on, the select/score switch is pushed. When this is done, decision block 158 detects such actuation during the next cycle and branches to the select/score branch as shown in FIG. 7C, this branch commencing with decision block 212 which determines if the game control register is in the game select mode (game control #0). In this mode, each actuation of the select/shoot switch 76a indexes is a register which in effect changes a score register to effect the game selection display as described above. Except as discussed below in connection with the cue up/shoot switch 76f, flags prevent the entry into the keyboard routine branches of FIG. 7 after the initial cycle.

In the game select mode, decision block 212 provides a "yes" response, eventuating in the setting of the appropriate game setting sound by action block 213, the incrementing of the game number by action block 216 and the resetting of the game numer counter by decision block 218, if the count is greater than 4, through action block 220. In either event, the branch exits, reference numeral 222 representing the exit from the select/score routine back to the beginning of the main loop at decision block 146 of FIG. 6A.

Assuming that game 1 is selected, the game is started by pressing the cue up/shoot switch 76f which causes the decision block 156 of FIG. 6A to enter the cue up/shoot branch of FIG. 7A at decision block 222. Since the game is in the game select mode, that decision block gives a "yes" response, decision block 224 determines that this is not game 2 and action block 226 sets the player number register to 1 since game 1 has only a single player. Decision block 228 responds "no" inasmuch this is not game 4 and the game control register is set to rack up mode (game control #8) by action block 229, the cue up/shoot routine being exited at junction 202 back to the beginning of the program. At this point, when the main loop reaches decision block 186 (FIG. 6E) and determines that the game control register is in the rack up mode, decision block 230 determines if seven balls have been racked. If the answer is "no", action block 232 increments a ball rack up register, initialized to 0, the first of seven operative positions. Action block 234 positions the seven balls (six regular balls and a cue ball) at predetermined initial positions in the display, the positions illustrated in FIG. 8A, ball 236 shown as a solid ball representing the brighter cue ball. Decision block 238 determines if the regular balls, during the rerack mode (game control #13) would overlie the last position of the cue ball, in which case, action block 240 would set the game control # for rack up and would exit to the junction represented by reference numeral 242 in FIG. 6E, and would return to the main branch of decision block 190. When in the rerack mode, after the first six balls are sunk, decision block 242 (FIG. 6E) determines if six balls have been racked, a "no" response resulting in the increment of the ball rack up number by action block 232, a "yes" response eventuating in the resetting of the ball rack up number register to 0 by action block 244, the same result being achieved by a "yes" answer from decision block 230. Action block 46 then sets the game control register to the pointer up mode (game control #1).

At this point the user has several choices, first, the cue ball can be repositioned by being displaced in the direction represented by one of arrows 248 of FIG. 8A by the ball up or ball over switches 76b and 76c. The ball up button serves to sequentially displace the cue ball indicia upwardly until it reaches the end of the array and then positions the cue ball at the bottom of the array in a like column. The ball over switch serves to index the cue ball indicia laterally up to the zone represented by dashed line 250 in FIG. 8A, the normal limit of initial placement of a cue ball in a conventional pool game. If either decision block 164 or decision block 166 detects an actuation of the ball up or ball over switches, the ball up/ball over routine of FIG. 7B is entered at decision block 252 which determines if the game control # is greater than 4, in which case the ball up/ball over switches are inoperative and the branch exits to the junction represented by reference numeral 202, at the beginning of the cycle. Decision branch 254 determines if the game control # equals 0, the game control mode, in which case the branch also exits to the branch represented by reference numeral 202. Decision branch 256 determines if the cue ball is in a "scratch" status; has the cue ball entered one of the pockets and left the display? If the answer is "yes", decision block 58 determines if the game is over, as would be the case in game 4, and if not, the cue ball is respotted by action block 260 and the branch exits to junction 202. If there is no scratch, then decision block 262 determines if the game is game 4, in which game it is always proper to move a ball, enabling action block 264 to set new ball coordinates. In other games, decision block 266 determines if it is a legal time to step before advancing to action block 266 or exiting to junction 202. From action block 264, the game control register is reset to game control #1, the idle board mode, by action block 268 and the branch exits to junction point 202. It should be noted in game 4, there is no restraint on the area of the matrix in which the cue ball and other balls may be positioned.

After the cue ball is positioned, the user must then set the direction in which the cue ball is to be shot.

This is achieved by actuating the direction switch 76e, whereby decision block 162 exits to the direction branch of FIG. 7D which determines if the game control register is at game control #1, the idle board mode. Initially, this would be the case and decision block 272 would determine if the cue ball was in a scratch state, in which case the branch would exit at junction 202, at the beginning of the loop. If decision block 272 responded "no", then action block 274 would set the pointer direction register, a register having eight positions, resulting in the lighting of indicia 276 (FIG. 8C), representative of a direction of travel of cue ball 236 in the direction pointed by indicia 276, i.e. toward the rack of balls. In this state, action block 278 would set the game control register to game control #2 representative of the pointer up mode and the loop would exit to junction 202. If the direction switch 76e were actuated a second time, decision block 270 would respond "no" and decision block 280 would determine if the "cue stick" indicia were visible, which cue stick indicia will be described below. If it is, then the pointer direction is reset to the 1 position as if this was the first time that the direction switch was actuated. If the cue stick indicia was not visible, then decision block 282 determines if the pointer indicia is up. If it is not, the branch is exited at junction 202. If it is, action block 284 resets the aim flags to the central position as will be more particularly described below and action block 286 rotates the pointer position in a clockwise direction by a 45 degree increment to a position represented by two x's 278, the branch then exiting at junction 202. In this manner, in response to each actuation of the direction switch 76e, the pointer is indexed in a clockwise direction by 45 degrees to any one of eight positions, seven of which are indicated by aligned x's in FIG. 8C. Each direction represents a direction of intended travel of the cue ball when the cue ball is shot.

Figure 8E:
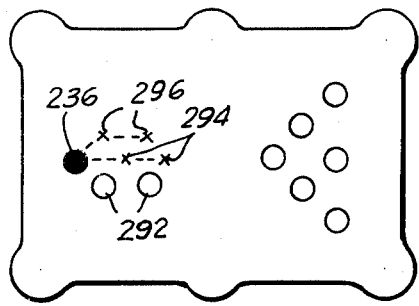
Figure 8F:
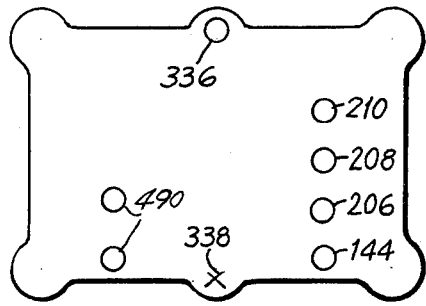

Aim switch 76d provides still a further refinement in direction of ball travel as illustrated in FIG. 8E, the branch as shown in FIG. 7E being entered by decision block 160 of FIG. 6B. Specifically, decision block 288 of FIG. 7E determines if the pointer indicia are visible, i.e., two indicia 276 are energized representing a direction of travel of the cue ball, one of eight possible directions. If the answer is yes, then action block 290 adjusts the aim sequentially in accordance with four position counts between positions shown in FIG. 8E. The first position, shown by indicia 292 representing the first count; x's 294 corresponding to the original direction representing a count of 2; x's 296 representing a count of 3 and a lateral displacement in a direction opposite to the position of count 1; count 4 being a return to the neutral position of x's 294 of FIG. 8E. Thereafter, the branch exits to junction 202 in the main program loop. Each actuation of aim switch 76d results in an index to the next aim position. The positions represented by indicia 292 nd x's 296 represent lateral displacements of the path of the cue ball for refined aiming. By way of example, in FIG 8E, if the aim is set at indicia 292, the cue ball 236 follows a path below the path defined by x's 294 but parallel thereto.

It should be understood that it is not necessary to the operation of the game to use the aim switch, and further, that if, after the aim switch is actuated to set a lateral displacement to the cue ball path, the direction switch is actuated, the aim switch setting is erased.

Figure 8G:
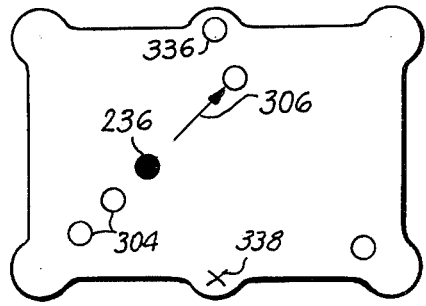

After the desired direction and path of the cue ball is established, the user then actuates the cue up/shoot switch 76f to perform the "cue up" function. Specifically, decision block 156 detects the actuation of the switch branching into decision block 222 of FIG. 7A. The response of decision block 222 is "no", advancing to decision block 291 which detects whether the game control register is at game control #1, the idle board mode. While in this case, the response is "no", if the response was "yes", the branch to decision block 293 would be followed, for the purpose of detecting if we are in game 4. If not, the branch exits to junction 202. If yes, the branch advances to decision block 294 which detects a scratch of the cue ball. If the response is "no", the branch exits to junction 202. If the response is "yes", the branch advances to action block 297 which sets an end of game (EOG) flag, representing the end of game 4, game 4 ending upon a scratch if cue button is depressed, and thereafter the branch exits to terminal 202. The "no" response to decision block 292 advances to decision block 298 which detects game control #2 in the game control register. In the instant case, the response would by "yes", advancing to action block 300 which sets up the display of the "cue stick", sets the game control register to game control #3 (cue up mode) and exits to junction 202. The "cue stick" is displayed by the lighting of a pair of matrix locations circumferentially spaced by 180 degrees from the pointer direction set by direction switch 96e. By way of example, in FIG. 8B, indicia 302 represents the cue stick positioned to strike the cue ball 236 in a position corresponding to the pointer location indicated by indicia 276 in FIG. 8C. In positioning the "cue stick" indicia, the lateral displacement achieved by aim switch 76d is ignored, although the aim diversion is stored in memory and when shot, cue ball 236 will travel along the path dictated by both the direction and aim settings. Referring to FIG. 8G, indicia 304 represent the "cue stick", and the intended direction of cue ball 36 is in the direction of arrow 306.

To effect the "shoot" of the cue ball, it is desirable not only to control the direction but the velocity, which velocity will control not only the distance and speed at which the cue ball travels, but also the distance and speed at which the other balls (shown as round open circles in FIGS. 8A, 8B, 8C, 8D, 8E and 8G), travel after being struck. "Shoot" is effected by actuating cue up/shoot switch 76f, but in this case, the duration during which the switch is actuated, up to a predetermined limit, controls the velocity and will be more particularly described below.

As before, decision block 156 enters the cue up/shoot routine of FIG. 7A and the sequence advances through decision blocks 222, 291 and 298 to decision block 308 which determines if there is a cue up condition. In this case, the response would be "yes" and the branch would advance to action block 310 which sets the game control # to a shooter mode (game control #9) and exits to junction 202 FIG. 6A). From junction 202, after passing through the time function of action blocks 146, 148 and 150, decision block 152 detects the shooter mode and advances into the variable shooter stage. Specifically, decision block 312 detects if the cue up/shooter switch is still down. If the response is "yes", the velocity register is incremented by one through action block 314. While there is a velocity counter associated with each ball, the variable shooter sequence applies only to the velocity counter associated with cue ball 7. The velocity counters of the other balls being set to 0. The velocity counter starts at 0 and indexes from 0 directly to 12 and then from 12 down to 1 in twelve steps with each passage through action block 314. In order to provide the user with an audible indicia of increased speed, each increment of the counter is reflected by a tone of increased frequency as set by action block 316, which establishes the desired sound number associated with the contents of the velocity register. Decision block 318, if the velocity register is not indexed down to 1, advances the program to the keyboard scan commencing with decision block 156. If the cue up/shoot switch is released or if the velocity counter reaches 1, then the branch advances to action block 320 which sets the cue ball movement counter to a maximum, in this case a count of 14. Thereafter action block 322 sets the game control register to game control #4 representative of the ball moving mode. The loop advances to decision block 176 of FIG. 6B which determines that the display control register is not in states 1 or 2, but rather is in state 0. In this case, the program advances to decision block 324 which determines if the display control register equals 4. This state of the display control register would be representative of the pointer up or cue up states, and if in this state, the program would advance to decision block 326 which determines if the ball being considered in this cycle is ball number 6. If the response is "yes", decision block 328 determines if the game is game number 3, the "position" game wherein the indicia representative of ball 204 (FIG. 8A) blinks, in which case the indicia representative of ball 204 is caused to blink by decision block 330 and the branch advances to the next stage of the cycle. If we are in display control register state 0, as we are, decision block 332 determines if the ball number is greater than 7. If the response is "no", the program advances to the branch of decision block 326 as described above. If the response is "yes", the program advances to decision block 334 which determines if the ball number equals 8. If the ball number equals 8 and this is game 2, then the ball 8 indicia, which is used during pointer up and cue up to display direction, is used in the shoot mode to display the player shooting. Specifically, by way of example, referring to FIGS. 3 and 8G, LED 84a represented by indicia 336 would blink, indicating that player 1 was shooting. When player 2 shoots, LED 84b at the location marked by a "x" identified by reference numeral 338 would blink. The blink control is regulated by decision block 340, exactly which of the two LED's 84a and 84b blinks, being determined by decision block 342 which determines if the end of turn (EOT) flag is set. The actual display function is performed by action block 344, the branch then returning to the next stage. It should be noted that action block 346 performs the display ball function in the absence of a blink command when the display control register equals 4.

Figure 6C:
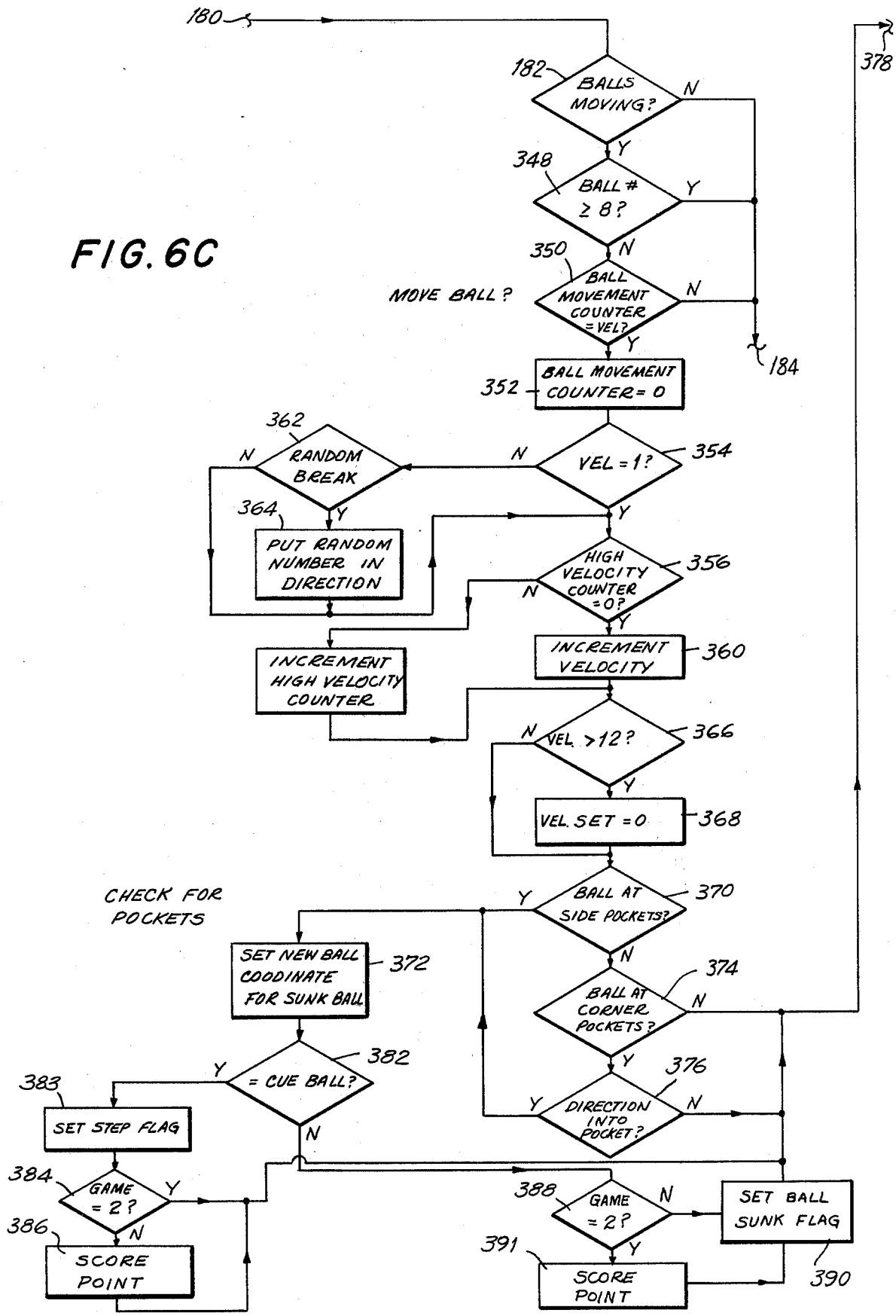

The next stage in the loop is the ball moving stage, a portion of which is illustrated in FIG. 6C, the entry to which is established by decision block 182 which determines if this is the ball moving mode as reflected by game control #4 of the game control register. In this case, the register is at game control #4 and the branch advances to decision block 348 which determines if the ball number is greater than or equal to 8, in other words, if the cycle concerns other than a ball. If the cycle does concern other than a ball, then decision block 348 exits to junction 184. If the cycle is a ball cycle, then decision block 350 determines if the ball should move. Specifically, the contents of the ball movement counter is compared with the contents of the velocity counter and if the contents of the ball movement counter is greater than or equal to the velocity counter, and if the contents of the velocity counter is not equal to 0, then the ball movement branch is entered by action block 352 which resets the pertinent ball movement counter to 0. Since decision block 350 excludes the case where the velocity counter equals 0, only the cue ball 7 can move at this stage. After the cue ball movement counter is reset to 0, decision block 354 determines if the velocity counter equals 1, the maximum velocity. If the response is "yes", decision block 356 determines if the contents of a special high velocity counter equals 0, said high velocity counter being set to 12 in response to the detection by decision block 354 that the main velocity counter equals 1, the maximum velocity setting. The purpose of the high velocity counter is to provide an additional, essentially double period of countdown during which the ball is moved, in response to a velocity counter setting of 1. The high velocity counter counts down to 0 through the branch including action block 358 and it is not until the high velocity counter equals 0, that the main velocity counter is counted down by action block 360. It should be noted that each indexing of the velocity or high velocity counters requires one cycle through the loop, additional cycles to the loop being required to index the ball movement counters to satisfy the requirements of decision block 350. Returning to decision block 354, if the velocity counter is not equal to 1, then the loop including decision block 362 must be followed, to determine if the game is at a point requiring a "random break". Such would be the case after an initial rack up or rerack as illustrated in FIG. 8B, in which case random numbers are applied to the various balls to create a random distribution such as is represented by FIG. 8D, as executed by action block 364. In either event, the branch returns to decision block 356.

After the velocity counter is incremented to the next higher number, decision block 366 determines if the count of the velocity counter exceeds 12, in which case the velocity counter is reset to 0 by action block 368.

The next portion of the cycle deals with the checking for coincidence between balls and pockets. Thus, action block 370 detects the presence of a ball at a side pocket, in which case action block 372 sets new ball coordinates for a sunk ball which will result in no visible display of that ball. Decision block 374 determines if the ball is at a corner pocket, in which case decision block 376 determines if the ball is headed into the pocket. In the latter case the branch is to action block 372. If the response to decision blocks 374 or 376 is "no", the branch is to junction 378 which leads to decision block 380 on FIG. 6D, which will be discussed below. Returning to action block 372, decision block 383 determines if the ball in question is a cue ball, a scratch condition, in which case action block 382 sets the necessary flags to permit resetting of the cue ball in response to the ball up switch. Thereafter, decision block 384 determines if the game is game 2, in which case the branch is to junction 378. If not, decision block 386 indexes the scoring and the branch is then to junction 378.

On the other hand, if decision block 382 determines that the ball was not a cue ball, decision block 388 determines if this is game 2, in which case action block 390 sets a ball sunk flag, enabling the same player to shoot again. If this is not game 2, action block 391 advances the scoring counter and in turn causes action block 390 to operate, which in turn returns to junction 378.

Figure 6D:
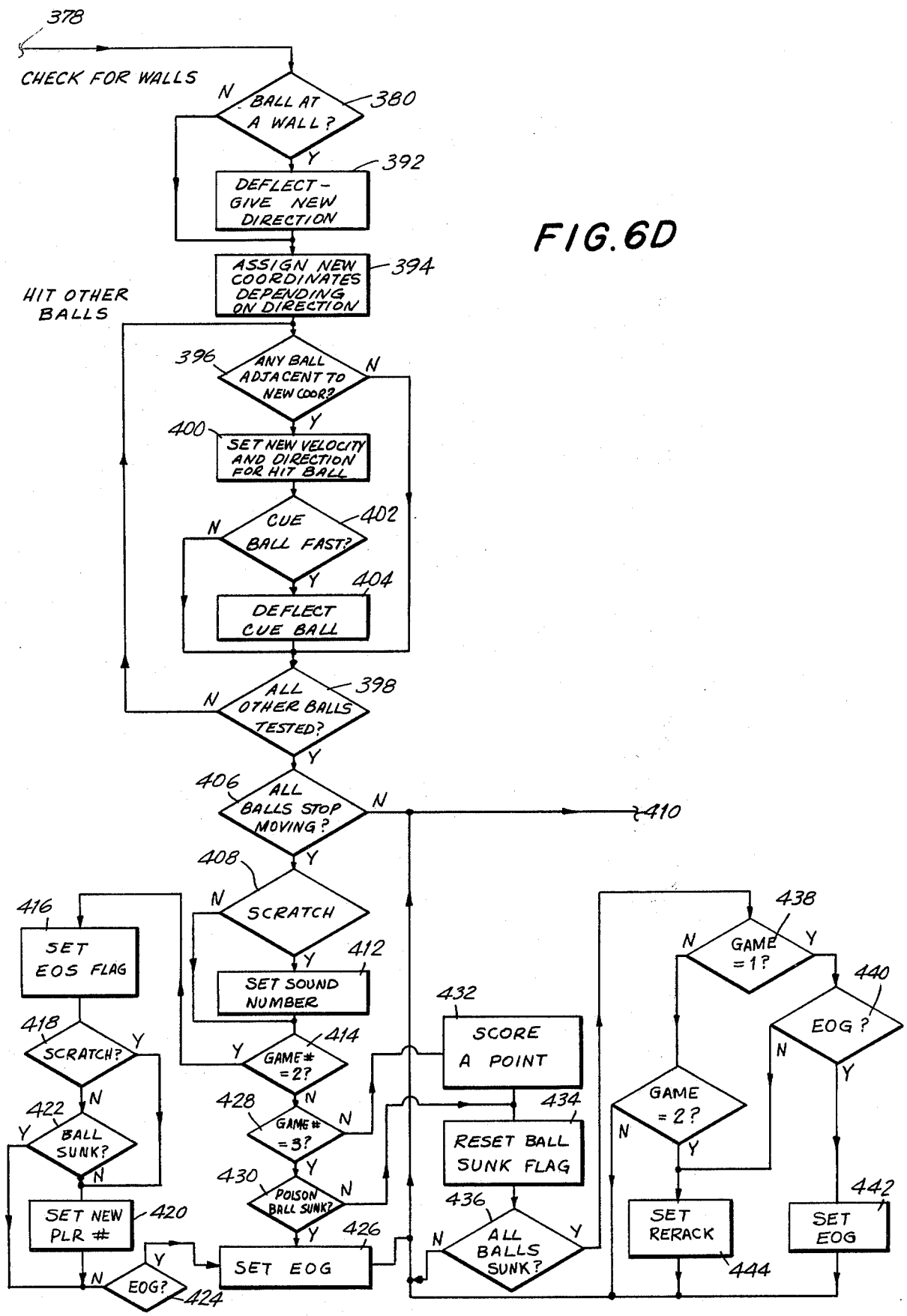

Referring now to FIG. 6D, junction 378 leads to decision counter 380 which forms a part of a wall detection sequence. If the ball is at a wall, action block 392 causes the ball to deflect and determines the direction of deflection, depending on the direction of incidence. Action block 394 effects movement of the ball, either in the initial direction or in the new direction depending on whether the ball was at a wall. Decision block 396 determines if any ball is adjacent to the new coordinates. If not, the sequence advances to decision block 398 which determines if all other potentially adjacent balls have been tested. If not, the sequence is repeated by return to decision block 396. If the response to decision block 396 is "yes" action block 400 sets a new velocity and direction for the hit ball in accordance with a predetermined formula. As a general proposition, if one ball hits another ball squarely, the velocity of the hitting ball is transferred to the hit ball (the contents of the velocity counter), the hitting ball loses its forward velocity and may stops and the hit ball continues moving with the velocity of the hitting ball. In the case of an indirect hit, the transferred velocity is divided between the two balls. Not only is velocity transferred but direction is transferred. In the event of such transfer, the ball movement counter of the hit ball is set to a maximum at the same time.

Decision block 402 determines if the moving ball is the cue ball, and if the cue ball is moving "fast". If the cue ball is hitting fast, then action block 404 deflects the cue ball, changing the direction thereof. If the cue ball is not moving fast, the cue ball continues on its prior path and the test of decision block 398 is performed. When sufficient cycles have been gone through so that all balls stop moving, all velocity counters equal 0, this state is detected by decision block 406 which advances to decision block 408 for the detection of a scratch. If all of the velocity counters are not at 0, so that one or more of the balls still must continue movement, then the decision block 406 branches to junction 410 which couples to FIG. 6E, and joins the main loop at decision block 190.

If decision block 408 detects a scratch, a suitable sound is actuated by action block 412. In either event, decision block 414 determines that this is game 2, in which event action block 416 sets end of shot (EOS) flag and decision block 418 determines if the ball is a scratch, in which event action block 420 sets a new player number. On the other hand, if it is not a scratch but decision block 422 determines that no ball was sunk, then action block 420 still sets the game for a new player. In any event, decision block 424 determines if the end of game (EOG) has been reached. If the response is "no", the branch is to junction 410. If end of game has been reached, action block 426 sets the end of game and the branch is to junction 410.

If decision block 414 determines that this was not game 2, then decision block 428 would determine if this is game, the "poison" ball game. If "yes", the decision block 430 would determine if the poison ball was sunk, in which case action block 426 would set end of game. If the response is "no", in decision block 428, action block 432 indexes the scoring mechanism and advances to action block 434 which resets the ball sunk flag. If this is game 3 and decision block 430 determines that the poison ball was not sunk, then the branch is to action block 434. Thereafter, decision block 436 determines if all balls have been sunk other than the cue ball. If the response is "no", the return is to junction 410. If the response is "yes", the branch is to decision block 438 which determines if this is game 1. If "yes", decision block 440 determines if this is the end of game, in which case action block 442 sets EOG and the branch returns to junction 410. If the response to decision block 440 is "no", the branch is to action block 444 which sets the game control register to game control #13, the rerack mode, and the branch is back to junction 410. If this is not game 1, decision block 446 determines if this is game 2. If "yes", action block 444 sets the game in the rerack mode. If not, it branches back to junction 410 for another cycle. This continues until the game is completed.

Referring now to FIG. 7C, the select/score keyboard routines, the remaining structure functions as follows. Upon the energization of the select/score switch, after decision block 212 is passed, decision block 450 determines if the game control register is set at a game control # great than 4. If not, decision block 452 determines if the game is game 4, the "trick shot" game, in which case decision block 454 determines if the game control register is set at game control #1, the idle board mode, in which case decision block 456 determines if there is a scratch condition. If the response to decision block 454 is "no", then the branch exits to junction 202. If decision block 456 detects a scratch, action block 458 clears the board, setting up the game for the seeding of a new ball, and thereafter action block 460 spots the cue ball, the first step in the operation of game 4, the branch returning to junction 202. If there is no scratch, decision block 462 determines if there is a ball at the current cue ball location. If the response is "yes", that ball is erased by action block 464 and the sequence returns to junction 202. If effect, in game 4, the cue ball is displaced and used to seed or erase other balls up to six for the setting of predetermined shots. The act of seeding or erasing is achieved by the actuation of select/score switch 76a, hence the above-described sequence. If there is no ball at the current cue ball location, then action block 466 seeds a ball and the sequence extends to junction 202. If decision block 452 determines that this is not game 4, then decision block 468 determines if this is game 3, in which case the sequence exits to junction 202. On the other hand, if the response to decision block 468 is "no", then this is game 1 or game 2 and the actuation of a select/score switch was intended to effect a display of the score, in which case action block 470 sets the display control register for score, mode 1 in the case of game 1 and mode 1 or mode 2, in the case of game 2, and the sequence exits at junction 202. Reverting to FIG. 7A, the cue up/shoot keyboard routine, at the beginning of game 2 (a two person competitive game), the maximum score which determines who wins may be set through a set score ceiling routine. Specifically, if decision block 224 responds "yes", action block 472 sets the ceiling to "10 points" and action block 474 sets the game control register in the set score ceiling mode, game control #11, thereafter exiting to junction 202. If the game control register is in the set score ceiling mode, the next actuation of the select/score switch causes decision block 476 to provide a "yes" response, in which case action block 478 increments the ceiling by 10 and returns to junction 202. Each actuation of the select/score switch further indexing the ceiling by 10. When cue up/shoot switch 76f is actuated, decision block 480 (FIG. 7A) causes action block 482 to retain the current ceiling, and to advance the sequence to action block 226, described above. It should also be noted that when the cue up/shoot switch is actuated and the game control register is in the win mode (game control #7), decision block 484 causes action block 297 to set the end of game flag.

Referring to the select/score keyboard routine of FIG. 7C, when the game control register is in the win mode (game control #7) and the select/score switch 76a is actuated, decision block 486 causes action block 470 to set the display control register in the appropriate score mode for the game in question. As discussed above in connection with FIG. 7C, in games 1 and 2 the user may selectively cause the display of the score by engaging and holding engaged select/score switch 76a. In addition, at the end of games 1 and 2, the score is automatically displayed. Referring to FIG. 8F, the score mode in game 2 is illustrated. The score is displayed by means of a multicolumn bar graph. Two columns on the right of the side pockets represent the units, five indicia per column, each indicia representing a count of 1. Thus, in the example of FIG. 8F, indicia 144, 206, 208 and 210 represent a count of 4. To the left of the side pockets as viewed in FIG. 8F, three or more columns, each consisting of five indicia represent the tens digit of the score, each indicia representing a count of 10. Thus, in FIG. 8F, indicia 490 represent a count of 20. In indicating the score for game 1, only the bar graphs appear. In game 2, indicia representative of the player whose score is displayed are also displayed, namely indicia 336 representative of player 1 and a corresponding indicia at the location illustrated by the "x" identified by reference numeral 338, which is associated with player number 2. In game 2, the first actuation of the select/score switch displays player 1's score while the second actuation displays player 2's score.

Referring to FIG. 6B, decision block 176, discussed above, distinguishes the case where the display control register is set in modes 1 or 2, the display modes, so that the display score sequence is followed. After power up and game selection, so that the response to decision block 178 is "no", action block 492 increments a column counter whereby the five score-indicating columns are sequentially multiplexed to limit power drain on the batteries. Decision block 494 detects a column counter count of greater than five which results in the resetting of said counters in action block 496 to 1. In any event, action block 498 turns on appropriate lines to depict the score, the sequence then exiting to junction 180.

As more particularly described above, the electronic pool game in accordance with the invention permits the play of a wide range of pool games simulating real pool games without requiring balls or other physical implements. Through the provision of direction and velocity control mechanisms in the game, the play value thereof is greatly enhanced as is the similarity to actual pool. Further, by providing game 4, wherein the user is enabled to design his own pool board layouts and practice shots, the utility of the pool game in accordance with the invention is greatly enhanced.

It will thus be seen that the objects set forth above, and those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An electronic pool game comprising matrix display means for providing a representation of the playing surface of a pool table; driving and control circuit means for applying driving signals to said matrix display means for the positioning of indicia representative of pool balls at discrete locations on said matrix display means, including a cue ball, and for providing further driving signals to said matrix display means for providing indicia representative of intended direction of displacement of said cue ball indicia; manually operable input switch means coupled to said driving and control circuit means for selective application of control signals to said driving and control circuit means for the selective positioning of said direction indicia and for the selective initiation of the displacement of said cue ball indicia in the direction determined by the positioning of said direction indicia, said driving and control means including means for detecting the duration that said input switch means is maintained in a selected state, and means for displacing the cue ball indicia over a distance representative of velocity of displacement, said velocity displacement being proportional to at least a portion of the duration that said input switch means is maintained in said selected state.

2. An electronic pool game as recited in claims 1, wherein said input switch means is adapted to apply further control signals to said driving and control circuit means for the selective positioning of pool ball indicia at discrete locations on said matrix display means, whereby the user may selectively design pool shot set ups.

3. An electronic pool game as recited in claims 1, wherein said driving and control circuit means includes score keeping means, said input switch means being adapted to supply still further control signals to said driving and control circuit means for the driving of said display means in accordance with the contents of said score keeping means, whereby indicia on said matrix display means may be representative of score.

4. An electronic pool game as recited in claim 3, wherein at least selected columns in said matrix display means are adapted for driving by said control and driving circuit means for the display of score in the form of a bar graph upon said matrix display means.

5. An electronic pool game as recited in claim 4, wherein at least one of said columns is representative of the units digit of score and at least one of said columns is representative of the tens digit of score.

6. An electronic pool game as recited in claim 1, wherein said matrix display means includes a matrix of LED means and plate means overlying said LED matrix, said plate means being provided with an aperture in registration with each LED means, each said aperture being of circular cross-section for defining a ball-shaped indicia.

7. An electronic pool game as recited in claim 1, wherein said input switch means is adapted to produce a first direction control signal to said driving and control circuit means, the first application of said first direction control signal causing said direction indicia to appear on said matrix display means positioned to represent a predetermined direction of displacement of said cue ball indicia, said driving and control circuit means being adapted for the indexing of said direction indicia circumferentially about said cue ball indicia between a plurality of discrete directions in response to successive applications of said first directional control signal from said input switch means.

8. An electronic pool game as recited in claims 1 or 7, wherein said input switch means is adapted to produce a second directional control signal, said driving and control circuit means being further adapted for indexing said direction indicia laterally of the intended direction of displacement a discrete amount for laterally displacing the desired path of said cue ball indicia in response to said second directional control signal.

9. An electronic pool game as recited in claim 1, including sound-making means, said driving and control circuit means being adapted to drive said sound-making means at a plurality of tones, said driving and control circuit means being adapted to produce a series of varying tones respectively representative of apparent velocity of displacement of said cue ball indicia during the duration that said input switch means is maintained in said selcted state for providing an audible indicia of apparent velocity being imparted to said cue ball indicia.

10. An electronic pool game as recited in claims 1, wherein said driving and control circuit means is adapted to position said direction indicia so as to extend radially from said cue ball indicia in the direction of intended displacement of said cue ball indicia.

11. An electronic pool game as recited in claim 10, wherein said input switch means is further adapted for the selective application of a cue stick control signal for application to said driving and control circuit means, said driving and control circuit means being adapted to produce a cue stick indicia extending radially of said cue ball indicia and displaced about 180 degrees from said direction indicia.

12. An electronic pool game as recited in claim 1, said driving and control circuit means including score keeping means, said input switch means being adapted to supply still further control signals to said driving and control circuit means for the driving of said display means in accordance with the contents of said score keeping means, at least selected columns in said matrix display means being adapted for driving by said control and driving circuit means for the display of score in the form of a bar graph upon said matrix display means, whereby indicia on said matrix display means may be representative of score.

13. An electronic pool game as recited in claim 12, wherein at least one of said columns is representative of the units digit of score and at least one of said columns is representative of the tens digit of score.

14. An electronic pool game comprising matrix display means providing a representation of the playing surface of a pool table, driving and control circuit means for applying driving signals to said matrix display means for the positioning of indicia representative of pool balls at discrete locations on said matrix display means, including a cue ball; and manually operable input switch means coupled to said driving and control circuit means for selective application of control signals of said driving and control curcuit means for the selective initiation of the displacement of said ball indicia, said driving and control circuit means including means for detecting the duration that said input switch means is maintained in a selected state for displaying said cue ball indicia along a distance representative of velocity of displacement, said velocity displacement being proportional to at least a portion of the duration that said input switch means is maintained in said selected state, whereby said cue ball indicia is to be displaced at a selected velocity.

15. An electronic pool game as recited in claim 14, wherein said driving and control circuit means includes score keeping means, said input switch means being adapted to supply still further control signals to said driving and control circuit means for the driving of said display means in accordance with the contents of said score keeping means, whereby indicia on said matrix display means may be representative of score.

16. An electronic pool game as recited in claim 15, wherein at least selected columns in said matrix display means are adapted for driving by said control and driving circuit means for the display of score in the form of a bar graph upon said matrix display means.

17. An electronic pool game as recited in claim 16, wherein at least one of said columns is representative of the units digit of score and at least one of said columns is representative of the ten digit of score.

18. An electronic pool game as recited in claim 14, including sound-making means, said driving and control circuit means being adapted to drive said sound-making means at a plurality of tones, said driving and control circuit means being adapted to produce a series of varying tones respectively representative of apparent velocity of displacement of said cue ball indicia during the duration that said input switch means is maintained in said selected state for providing an audible indicia of apparent velocity being imparted to said cue ball indicia.

19. An electronic pool game, as recited in claims 1 or 14, including portable case means supporting said display means, driving and control circuit means and input switch means.

* * * * *